Patented June 24, 1947

2,422,919

UNITED STATES PATENT OFFICE 2,422,919

MANUFACTURE OF CHLORINATED POLYTHENES

James Robertson Myles and Philip James Garner, Northwich, England, assignors to Imperial Chemical Industries Limited, a corporation of Great Britain No Drawing. Application November 18, 1942, Serial No. 466,058. In Great Britain November 26, 1941

3 Claims. (Cl. 204—163)

This invention relates to an improved process for the chlorination of solid and semi-solid polymers of ethylene. Such polymers are now known as polythenes.

According to British Patent 481,515, the normally solid polymers of ethylene may be halogenated by subjecting them to the action of free halogen or certain halogen compounds. The semi-solid polymers of ethylene may also be halogenated by a similar method. By that process the rate of reaction at room temperature is slow and only about 20% of chlorine can be introduced unless the reaction time is unduly prolonged. The reaction is more rapid in the hot, especially when solvents such as carbon tetrachloride are used, and products containing e. g. 45% chlorine can be obtained in a reasonable time, but it is slow when non-solvents are used as dispersing media. The object of the present invention is to provide an improved technique for chlorinating normally solid and semi-solid polythenes, which gives a substantial increase in the rate of chlorination at all temperatures and can also give products of higher chlorine content.

According to the present invention, chlorinated polythenes are manufactured by a process which comprises subjecting solid or semi-solid polythenes to the action of chlorine in the presence of an inert liquid medium, and in the absence of excessive amounts of oxygen, the reaction zone being illuminated with sunlight or artificial light, and at least part of the heat evolved by the reaction being removed. Although the invention is not restricted thereto, our process may include the following additional features: removing the hydrogen chloride from the reaction mixture, agitating the reaction mixture, removing the inert liquid medium from the chlorinated polythenes, and operating the process in a continuous manner. A further feature which is applicable when the polythene is treated in the form of a suspension in the liquid medium is the use of the polythene in a finely divided state.

The inert liquid medium may be used either for dissolving or dispersing the polythene, thus rendering it readily attacked by the chlorine. It must be a liquid which does not interfere with the reaction, and is preferably a colourless liquid which dissolves polythene when hot. The preferred liquid is carbon tetrachloride, but other liquids such as water or chlorinated solvents may also be used.

The bulk of the oxygen must be displaced from the reaction vessel, or otherwise the start of the reaction is delayed until the chlorine content has built up to about 7 grams of chlorine per 100 ccs. of the reaction mixture, and then the reaction proceeds with uncontrolled violence, especially at temperatures below about 50° C. If the reaction gets out of control in this manner it can be slowed down again by removing the illumination. In the cold, even traces of air have this delaying effect, but when the chlorination is carried out at higher temperatures larger amounts can be tolerated. Whilst a trace of oxygen may be desirable to catalyse the reaction, the presence of larger quantities has an inhibiting effect and it also tends to degrade the polymer giving a product of low molecular weight which is not always desirable. The chlorine employed should not contain more than a trace of oxygen, particularly in the early stages of the chlorination.

Whilst sunlight is an effective source of illumination for this reaction, it is generally difficult to use in large scale manufacture. Artificial light when used for this reaction should not have a high proportion of ultraviolet radiation as this tends to give opaque or insoluble products, especially with long exposures such as are required for products of high chlorine content. One suitable source of illumination is a "daylight" fluorecent tube as this illumination is very rich in green and yellow light of 4785 A. and below. Alternatively the illumination may be screened by a yellow transparent screen which removes undesirable wavelengths without affecting the useful radiation. The intensity of light required is not critical; even small intensities have a substantial effect on the efficiency and rate of chlorination, and with high intensities further increases have little effect. A suitable intensity is 50–1000 candlepower per 10 litres of reaction space. It is convenient to employ an apparatus which has one or more glass walls so that the illumination is spread well throughout the reaction zone. Any substantial heating effect by the illumination is also undesirable as this tends to cause film-formation on such glass walls which obscures the passage of light.

Such illumination causes a substantial rise in the efficiency of the reaction of the chlorine passed through the reaction mixture. Thus, other factors being equal, by illuminating the reaction the proportion of chlorine conversion is increased from about 30% of that passed through to 50–90%. At the same time it substantially decreases the time required for the chlorination. For example a product containing 50% chlorine by weight can be obtained in 1–3 hours, compared with 3–10 hours in the dark.

A considerable amount of heat is evolved during the reaction, approximately 850 calories per gram of chlorine reacted. Unless steps are taken to remove at least part of this heat the rise in temperature makes it impossible to control the reaction to yield the most desirable products. The most desirable products are those which contain at least 25% of chlorine by weight, most of which should be introduced at a temperature below 40° C. As the most suitable concentration of polythene in the reaction mixture for convenient working is about 5–8 grams per 100 ccs., this chlorination would give a total rise of temperature exceeding 80° C. Thus the reaction mixture must be cooled, preferably at least during the intermediate stages of the chlorination.

Good agitation during the chlorination is necessary if a reasonably high rate of absorption of chlorine is to be obtained. Not only does it permit good absorption rates and steady removal of heat, but in the case of chlorinating suspensions of polythene it assists by exposing fresh surfaces of the suspended particles to the light and the chlorine.

One method of carrying out the chlorination of polythene suspended in an inert liquid medium by a batch process in accordance with this invention may be illustrated in the following way.

Polythene is dissolved in hot carbon tetrachloride and the solution is cooled while stirring briskly, giving a cold suspension of finely divided polythene in the carbon tetrachloride. The bulk of the oxygen is displaced from the reaction vessel while cooling by a stream of carbon dioxide or by a stream of chlorine passed through in the dark and the reaction zone is then illuminated by sunlight or artificial light. Chlorine gas is then bubbled through the suspension and the issuing gas containing hydrogen chloride and excess chlorine is removed, the temperature meanwhile being controlled by a stream of cooling water passed through cooling coils. After the selected amount of chlorine has been introduced into the polythene, which amount may be measured by determining the amount of hydrogen chloride removed, the chlorinated polythene may be separated by passing the reacted mixture into hot water, distilling off the carbon tetrachloride, leaving the product floating as a white solid on the water from which it is strained off and dried.

Alternatively, the chlorination can be carried out at a higher temperature, in which case the polythene may all be dissolved if carbon tetrachloride is used, or suspended if a non-solvent such as water is used. If carbon tetrachloride is used the product may if desired be retained in the form of a solution, or it may be isolated as above or by adding the reacted mixture to a liquid such as alcohol which is miscible with the carbon tetrachloride, giving a liquid mixture which is a non-solvent for the chlorinated polythene. When using this last method of separation, residual chlorine and hydrogen chloride should first be removed from the reaction mixture, as failure to do so yields a product which is not so stable to exposure to heat and light. The process may be carried out in one vessel, or in a series of vessels working under different conditions; such vessels may be bubbling towers of the usual types made of suitable materials.

The process can also be made continuous after the chlorination has been carried to the desired stage, by continuing to feed the chlorine gas and the solution or suspension of polythene in the inert liquid into the reaction zone or series of reaction zones at the desired rates while cooling and continuously withdrawing the hydrogen chloride and the reacted mixture at corresponding rates for isolation of the product as desired.

The inert liquid may be returned for re-use after separating it from the product, and if necessary after removing from it any accumulated impurities such as low molecular weight organic chlorine compounds derived from side reactions or traces of impurities. These may be removed from the inert liquid by fractional distillation.

Chlorinated polythenes containing more than 25% by weight of chlorine are non-inflammable. Those obtained by hot chlorination are in general soft, rubbery, plastic and more easily soluble than corresponding products obtained by cold chlorination. Those prepared by cold chlorination and containing 30–40% of chlorine are suitable for use in extrusion and other hot moulding processes to give flexible objects. With higher chlorine contents, rigid articles of high tensile strength may be made from them, for instance by compression moulding at about 160° C. When in the form of solutions, the chlorinated polythenes may be used as varnishes and for making supported and unsupported films by known methods. Such films may conveniently be made at an elevated temperature to facilitate the removal of the solvent and increase the coherence of the film. Chlorinated polythenes may also be used in the form of pastes, dispersions and emulsions, particularly for coating and impregnating articles. Such pastes may be obtained from powders, and may be applied by spreading and then heating to about 110°–120° C. to homogenise the chlorinated polythene by removing the liquid medium and coagulating the particles. If desired, other materials may be used in conjunction with the chlorinated polythenes, e. g. finely divided fillers, colouring matter, stabilisers, plasticisers, and other thermoplastic materials. Finished articles may be hot-pressed at about 120° C. to give a surface polish, and threads and films may be strengthened by hot or cold drawing under sufficient tension to exceed the yield point at the temperature of drawing. Articles made from chlorinated polythenes may be joined together by a welding technique, using filler rods of 1/8" diameter heated by air at 250° C. and squeezing the rod into the gap to effect a joint.

The invention is illustrated but not restricted by the following example.

*Example*

Into a closed glass vessel fitted with a stirrer and cooling coils is introduced 10 litres of hot carbon tetrachloride in which is dissolved by boiling 800 grams of polythene of molecular weight 10,000. The solution is cooled quickly while stirring rapidly, whereupon crystallisation starts at 55° C. and the suspension is cooled to 25° C. Air is displaced from the vessel by passing carbon dioxide through during boiling and the subsequent cooling. The stream of carbon dioxide is then replaced by chlorine containing 0.1% of oxygen at a rate of 15 grams per minute while stirring, and the reaction zone is illuminated with a 1000 candlepower light rich in wavelengths of 4785° A. and below. At the same time, the flow of cooling water is controlled so that the temperature is kept between 20° and 35° C. The hydrogen chlorine liberated is removed and collected as a measure of the amount of reaction which has occurred. After 2 hours the cooling water is stopped and shortly afterwards the stream of chlorine and the illumination are stopped. The reacted mixture is then slowly poured into hot water and the carbon tetrachloride is distilled off. The white solid floating on the water is isolated and dried, giving a product containing 50% chlorine by weight, which is suitable for moulding by known methods into stiff flexible articles.

What we claim is:

1. A process for the manufacture of chloropolythene which comprises dissolving polythene in boiling carbon tetrachloride, cooling the resulting solution with rapid stirring to a temperature of about 25° C., displacing the air in the said mixture with an inert gas during the said boiling and cooling whereby a suspension of polythene is produced, replacing the said inert gas by chlorine containing about 0.1% of oxygen, illuminating the resulting mixture with artificial illumination rich in green and yellow light of 4785 Å. and below but not rich in ultraviolet radiation, removing at least a part of the heat of the resultant reaction, continuing the introduction of the said chlorine until a chloropolythene containing about 50% by weight of chlorine is obtained, and thereafter separating the said chloropolythene from the resulting reaction mixture.

2. A process for the manufacture of chloropolythene which comprises displacing the bulk of the oxygen from a reaction vessel containing a suspension of polythene in an inert liquid medium, thereafter passing chlorine through the said suspension in the said reaction vessel with agitation in the absence of any amount of oxygen substantially in excess of 0.1% based on the weight of chlorine present, while illuminating the reaction zone with artificial illumination rich in green and yellow light of 4785 Å. and below but substantially free of ultraviolet radiation, continuing the passing of chlorine through the suspension in the said inert liquid medium until the resultant chloropolythene contains at least 25% chlorine by weight, removing at least a part of the heat of reaction, maintaining the temperature of the chlorination mixture below 40° C. during introduction of most of the said chlorine, removing the issuing gas containing excess chlorine, and thereafter separating the said chloropolythene from the remaining reaction mixture.

3. The process set forth in claim 2 in which the said inert medium is carbon tetrachloride.

JAMES R. MYLES.
PHILIP J. GARNER.

REFERENCES CITED

The following references are of record in the file of this patent:

UNITED STATES PATENTS

| Number | Name | Date |
|---|---|---|
| 2,291,574 | Gleason | July 28, 1942 |
| 1,245,553 | Bedford | Nov. 6, 1917 |
| 1,420,346 | Snelling | June 20, 1922 |
| 1,828,858 | Conklin | Oct. 27, 1931 |
| 2,132,361 | Osswald et al. | Oct. 4, 1938 |
| 2,183,556 | Fawcett | Dec. 18, 1939 |
| 2,213,331 | Arverson | Sept. 3, 1940 |
| 2,148,830 | North | Feb. 28, 1939 |
| 2,333,788 | Holbrook et al. | Nov. 9, 1943 |
| 2,268,162 | Myles et al. | Dec. 30, 1941 |
| 2,352,525 | Evans | June 27, 1944 |
| 1,129,165 | Buchner | Feb. 23, 1915 |
| 2,398,803 | Myles et al. | Apr. 23, 1946 |

OTHER REFERENCES

Artificial Sunlight, by Luckiesh, 1930, pages 69, 70, 120–125.

The Chemical Action of Ultraviolet Rays, by Ellis et al., pages 52, 53 and 526–535, 1941.